US011892184B2

(12) United States Patent
Nakano

(10) Patent No.: US 11,892,184 B2
(45) Date of Patent: Feb. 6, 2024

(54) FACILITY APPARATUS CONTROL DEVICE AND FACILITY APPARATUS CONTROL METHOD

(71) Applicant: Mitsubishi Electric Corporation, Tokyo (JP)

(72) Inventor: Satoshi Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 150 days.

(21) Appl. No.: 17/289,140

(22) PCT Filed: Dec. 3, 2018

(86) PCT No.: PCT/JP2018/044386
§ 371 (c)(1),
(2) Date: Apr. 27, 2021

(87) PCT Pub. No.: WO2020/115791
PCT Pub. Date: Jun. 11, 2020

(65) Prior Publication Data
US 2021/0381710 A1 Dec. 9, 2021

(51) Int. Cl.
*F24F 11/63* (2018.01)
*G06N 20/00* (2019.01)
(Continued)

(52) U.S. Cl.
CPC .............. *F24F 11/63* (2018.01); *F24F 11/58* (2018.01); *G06N 20/00* (2019.01); *G06V 40/10* (2022.01); *F24F 2120/12* (2018.01)

(58) Field of Classification Search
CPC ............ G05B 15/02; G05B 2219/2614; G05B 2219/2642; G05B 13/0265; G05B 13/027;
(Continued)

(56) References Cited

U.S. PATENT DOCUMENTS 6,856,249 B2 * 2/2005 Strubbe .............. G08B 21/0476
340/556
6,996,256 B2 * 2/2006 Pavlidis ............... G06V 40/166
382/128
(Continued)

FOREIGN PATENT DOCUMENTS

JP    H06117836 A    4/1994
JP    2010-091228 A  4/2010
(Continued)

OTHER PUBLICATIONS

International Search Report dated Jan. 15, 2019, in corresponding International Patent Application PCT/JP2018/044386 (and English translation).

*Primary Examiner* — Darrin D Dunn
(74) *Attorney, Agent, or Firm* — POSZ LAW GROUP, PLC

(57) ABSTRACT

A facility apparatus control device includes: first and second image capturing units capturing images of first and second spaces; a data-for-learning generator generating location information on a person in the first space by analyzing a first image captured and extracting therefrom, an image of a range including the person in the first space; a learning unit learning, using the location information and a first extracted image extracted by the data-for-learning generator, a feature of the person in the first space and a staying location of the person in the first space; a person detector detecting a person in the second space by analyzing a second image captured and extracting therefrom, an image of a range including the detected person; and an apparatus controller controlling a facility apparatus installed in the first space using a second extracted image extracted by the person detector and a learned result of the learning unit.

8 Claims, 4 Drawing Sheets

(51) Int. Cl.
  *F24F 11/58* (2018.01)
  *G06V 40/10* (2022.01)
  *F24F 120/12* (2018.01)

(58) Field of Classification Search
  CPC .. G05B 13/048; G05B 13/028; G05B 13/042; F24F 11/64; F24F 11/30; F24F 2120/10; F24F 11/65; F24F 11/62; F24F 2120/12; F24F 2120/14; G06V 20/52; G06V 40/10; G06V 10/82; G06V 40/172; G06V 40/16; G06V 10/25; G06V 10/255; G06V 10/764; G06V 20/44; G06V 40/174; G06V 40/168; G06V 40/166; G06V 40/165; G06V 40/171; G06N 3/08; G06N 3/0454; G06N 20/00
  See application file for complete search history.

(56) References Cited

U.S. PATENT DOCUMENTS

| | | | | |
|---|---|---|---|---|
| 7,298,871 | B2 * | 11/2007 | Lee | H04L 12/2829 382/115 |
| 7,663,502 | B2 * | 2/2010 | Breed | B60R 25/255 340/7.29 |
| 9,477,215 | B2 * | 10/2016 | Blum | H05B 47/115 |
| 9,791,872 | B2 * | 10/2017 | Wang | F24F 11/46 |
| 9,869,484 | B2 * | 1/2018 | Hester | F24F 11/48 |
| 10,205,891 | B2 * | 2/2019 | Nakash | H04N 5/23218 |
| 10,270,609 | B2 * | 4/2019 | Saxena | G06N 20/00 |
| 10,304,319 | B2 * | 5/2019 | Sager | G01K 1/14 |
| 10,380,429 | B2 * | 8/2019 | Chaudhry | H04N 7/181 |
| 10,387,716 | B2 * | 8/2019 | Kim | G06V 40/161 |
| 10,489,690 | B2 * | 11/2019 | Jin | G06K 9/622 |
| 10,540,873 | B2 * | 1/2020 | Phillips | H04L 67/12 |
| 10,748,024 | B2 * | 8/2020 | Ungarish | G06V 20/52 |
| 10,755,106 | B1 * | 8/2020 | Bakry | G06V 40/103 |
| 10,775,064 | B1 * | 9/2020 | Vega | F24F 11/58 |
| 10,871,302 | B2 * | 12/2020 | Song | F24F 11/64 |
| 10,942,637 | B2 * | 3/2021 | Mani | H04N 5/247 |
| 11,043,090 | B1 * | 6/2021 | Ulen | H04R 3/005 |
| 11,188,046 | B1 * | 11/2021 | ElHattab | G08B 13/19641 |
| 11,243,502 | B2 * | 2/2022 | Saxena | G05B 13/0265 |
| 11,301,779 | B2 * | 4/2022 | Song | F24F 11/30 |
| 11,353,848 | B1 * | 6/2022 | Madden | H04N 7/183 |
| 11,371,739 | B2 * | 6/2022 | Wenzel | F24F 11/46 |
| 2003/0227439 | A1 * | 12/2003 | Lee | H04N 21/42202 345/156 |
| 2018/0018508 | A1 * | 1/2018 | Tusch | G06V 40/20 |
| 2019/0042854 | A1 * | 2/2019 | Sanjay | G06V 20/52 |
| 2019/0102812 | A1 * | 4/2019 | Giorgi | G06Q 20/14 |
| 2019/0122065 | A1 * | 4/2019 | Ungarish | G06V 10/255 |
| 2019/0205625 | A1 * | 7/2019 | Luo | G06N 3/0454 |
| 2019/0215184 | A1 * | 7/2019 | Emigh | G05B 15/02 |
| 2019/0222433 | A1 * | 7/2019 | Saxena | H04L 67/52 |
| 2019/0325660 | A1 * | 10/2019 | Schmirler | G06F 3/011 |
| 2020/0012242 | A1 * | 1/2020 | Fadell | H04W 4/80 |
| 2020/0014552 | A1 * | 1/2020 | Tan | H04L 12/2809 |
| 2020/0070839 | A1 * | 3/2020 | Cho | B60N 2/0244 |
| 2020/0110532 | A1 * | 4/2020 | Mani | G06V 40/113 |
| 2020/0334831 | A1 * | 10/2020 | Roth | G06T 7/90 |
| 2020/0355391 | A1 * | 11/2020 | Wenzel | G06N 3/0454 |
| 2020/0410712 | A1 * | 12/2020 | Haven | G06T 7/74 |
| 2021/0056161 | A1 * | 2/2021 | Thouppuarachchi | G06F 30/20 |
| 2021/0117693 | A1 * | 4/2021 | Martin | G06T 7/246 |
| 2021/0279475 | A1 * | 9/2021 | Tusch | H04L 63/0861 |
| 2021/0285671 | A1 * | 9/2021 | Du | G05B 13/048 |
| 2021/0398032 | A1 * | 12/2021 | Amiri | H04N 7/157 |
| 2022/0006664 | A1 * | 1/2022 | Emigh | G06N 20/00 |

FOREIGN PATENT DOCUMENTS

| | | |
|---|---|---|
| JP | 2011137589 A | 7/2011 |
| JP | 2016-173215 A | 9/2016 |
| JP | 2017-227437 A | 12/2017 |

* cited by examiner though for the first space 10a, with a feature of the person 11a present in the first space 10a and a staying location occupied by the person 11a in the first space 10a, the first extracted image being an image extracted by the data-for-learning generating unit; a person detecting unit that detects a person present in the second space by analyzing a second image and extracts, from the second image, an image of a determined range covering the detected person, the second image being an image captured by the second image capturing unit; and an apparatus control unit that controls a facility apparatus installed in the first space with use of a second extracted image and a learned result obtained by the learning unit, the second extracted image being an image extracted by the person detecting unit.

FACILITY APPARATUS CONTROL DEVICE AND FACILITY APPARATUS CONTROL METHOD

CROSS REFERENCE TO RELATED APPLICATION

This application is a U.S. National Stage Application of International Patent Application No. PCT/JP2018/044386 filed on Dec. 3, 2018, the disclosure of which is incorporated herein by reference.

TECHNICAL FIELD

The present invention relates to a facility apparatus control device, a facility apparatus control method, and a learning method which are intended to control a facility apparatus.

BACKGROUND

In recent years, a facility apparatus that predicts user's behavior and accordingly performs its operation, so as to improve the user's comfort has been proposed. An air conditioner described in Patent Literature 1 detects a location of a human body on the basis of image information obtained by capturing an image inside a room, and stores therein human body location information indicating the detected location in association with time information indicating the time when the human body location information has been acquired. On the basis of the human body location information and time information stored, the air conditioner estimates an area where a user is present at the current time and an area where a user is to be present afterwards, and performs air-conditioning in the estimated areas as a target area.

Patent Literature

Patent Literature 1: Japanese Patent Application Laid-open No. 2016-173215

However, there has been a problem with the inventive technique described in Patent Literature 1 in that when two or more users are present, it is not possible to identify each of the users and perform air-conditioning in a manner suitable for each of the users.

SUMMARY

The present invention has been achieved in view of the above circumstances, and an object of the present invention is to provide a facility apparatus control device capable of controlling a facility apparatus in a manner suitable for each user even when there are two or more users staying in a space where the facility apparatus is installed.

In order to solve the above problems and achieve the object, the present invention provides a facility apparatus control device comprising: a first image capturing unit that captures an image of a first space; a second image capturing unit that captures an image of a second space; a data-for-learning generating unit that generates location information on a person present in the first space by analyzing a first image and extracts, from the first image, an image of a determined range covering the person present in the first space, the first image being an image captured by the first image capturing unit; a learning unit that learns, using the location information generated by the data-for-learning gen- The facility apparatus control device according to the present invention has an advantageous effect that control on a facility apparatus can be performed in a manner suitable for a user even when there are two or more users staying in a space where the facility apparatus is installed.

DETAILED DESCRIPTION

A facility apparatus control device, a facility apparatus control method, and a learning method according to embodiments of the present invention will be described in detail below with reference to the drawings. The present invention is not necessarily limited by these embodiments.

First Embodiment

Figure 1:
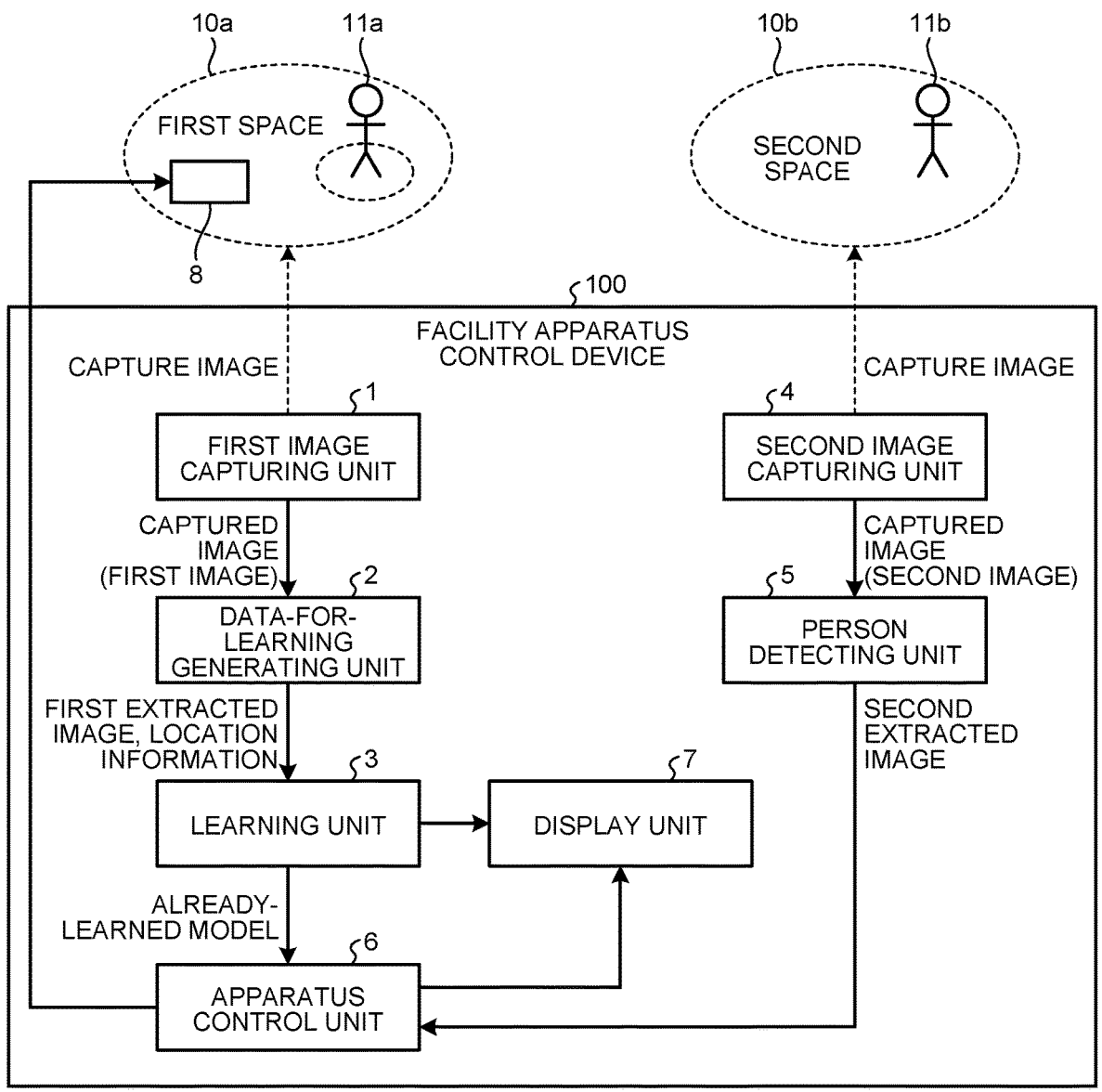
FIG. 1 is a diagram illustrating a configuration example of a facility apparatus control device according to a first embodiment.

FIG. 1 is a diagram illustrating a configuration example of a facility apparatus control device according to a first embodiment of the present invention. A facility apparatus control device 100 according to the first embodiment includes a first image capturing unit 1, a data-for-learning generating unit 2, a learning unit 3, a second image capturing unit 4, a person detecting unit 5, an apparatus control unit 6, and a display unit 7.

The operation of the facility apparatus control device 100 is briefly described below. The facility apparatus control device 100 learns a feature of a person 11a using an image obtained by the first image capturing unit 1 capturing an image of a first space 10a. When a person 11b detected in a second space 10b has a feature much similar to the feature of the person 11a, that is, when the facility apparatus control device 100 determines that the already-learned person 11a is present in the second space 10b, the facility apparatus control device 100 executes control to start running of a facility apparatus 8 installed in the first space 10a. Examples of the facility apparatus 8 include an air-conditioning device, a lighting equipment, a personal computer, and so on. The facility apparatus control device 100 determines whether or not the already-learned person 11*a* is present in the second space 10*b* with use of an image obtained by the second image capturing unit 4 capturing an image of the second space 10*b* and with use of an already-learned model indicating a learned result. While there is a single second space 10*b* in FIG. 1, there may be two or more second spaces 10*b*. In addition, it is allowable that the second space 10*b* partially overlaps the first space 10*a*. In a case where there are two or more second spaces 10*b*, one of the second spaces 10*b* is equal to the first space 10*a*. FIG. 1 illustrates only one facility apparatus 8 installed in the first space 10*a* for the sake of convenience. However, in practice, two or more facility apparatuses 8 are assumed to be installed in the first space 10*a*.

In the facility apparatus control device 100, the first image capturing unit 1 is a visible-light camera or an infrared camera. When the first image capturing unit 1 is configured using the infrared camera, cost thereof can be reduced as compared to the case where the first image capturing unit 1 is configured using the visible-light camera. The first image capturing unit 1 captures an image of the first space 10*a*, and outputs a captured image that is an image obtained by the image capture to the data-for-learning generating unit 2. The captured image outputted by the first image capturing unit 1 to the data-for-learning generating unit 2 is a first image. The first space 10*a* is assumed to be an office or the like, and a position in which the person 11*a* stays in the first space 10*a* is assumed to be fixed. The first image capturing unit 1 is assumed to repeatedly capture an image in a predetermined cycle, and an image-capturing range is assumed to be fixed.

When receiving an input of a captured image from the first image capturing unit 1, the data-for-learning generating unit 2 checks whether the person 11*a* appears in the captured image by analyzing the captured image. When the person 11*a* appears in the captured image, the data-for-learning generating unit 2 generates data for learning and outputs it to the learning unit 3. Specifically, when the person 11*a* appears in the captured image, the data-for-learning generating unit 2 extracts, from the captured image, an image of a certain range covering the person 11*a*, and outputs the extracted image and the location information to the learning unit 3 as data for learning. The location information outputted by the data-for-learning generating unit 2 to the learning unit 3 indicates the location of the person 11*a* in the first space 10*a*, the person 11*a* being covered by the image extracted by the data-for-learning generating unit 2. In the following description, an image extracted from a captured image by the data-for-learning generating unit 2 is hereinafter referred to as "first extracted image". There may be a case where two or more persons appear in a single captured image inputted from the first image capturing unit 1 to the data-for-learning generating unit 2. When plural persons appear in a single captured image, the data-for-learning generating unit 2 generates data for learning on each of the persons appearing in the captured image. That is, the data-for-learning generating unit 2 generates a first extracted image for each of the persons appearing in the captured image, and combines the generated first extracted image with the location information on the person appearing in the generated first extracted image to generate a resultant set of data for learning. In this case, the learning unit 3 receives inputs of the data sets for learning, where the number of the input data sets is equal to the number of persons appearing in the captured image.

In a case where the captured image is an image captured by the visible-light camera, the data-for-learning generating unit 2 compares the captured image inputted from the first image capturing unit 1 with a comparative image to thereby determine whether or not a person appears in the captured image, the comparative image being, for example, generated by the first image capturing unit 1 capturing in advance an image of the first space 10*a* when there is no person in the first space 10*a*. In a case where the captured image is a thermal image captured by the infrared camera, the data-for-learning generating unit 2 determines that a person appears in the captured image when, for example, there is a heat distribution in the captured image, the heat distribution being similar to a person's body temperature and having a pattern similar to the shape of a person.

For example, the data-for-learning generating unit 2 calculates the location information on the person 11*a* appearing in the first image with use of the location of the person 11*a* appearing in the first image, the installation location of the first image capturing unit 1, and a direction (an angle) in which or at which the first image capturing unit 1 is directed. The location information to be outputted by the data-for-learning generating unit 2 may be any information as long as it is information from which it is possible to know where the person 11*a* is present in the first space 10*a*. For example, it is allowable that the captured image is divided in a grid fashion into plural areas to be managed, and identification information uniquely specifying any of the areas is used as the location information.

When receiving an input of the data for learning from the data-for-learning generating unit 2, the learning unit 3 learns, with use of the first extracted image and the location information included in the data for learning, a feature of the person 11*a* included in the first extracted image and a staying location occupied by the person 11*a* in the first space 10*a*, the person 11*a* being included in the first extracted image. Specifically, the learning unit 3 uses the location information as a label, and learns the feature of the person 11*a* included in the first extracted image by deep learning. That is, the learning unit 3 generates a feature vector by analyzing the first extracted image received from the data-for-learning generating unit 2, and stores the generated feature vector in association with the location information received from the data-for-learning generating unit 2, so as to generate an already-learned model indicating a feature of a person occupying a location indicated by the location information received from the data-for-learning generating unit 2.

The second image capturing unit 4 is configured with a camera similar to that of the first image capturing unit 1. The second image capturing unit 4 captures an image of the second space 10*b*, and outputs a captured image that is an image obtained by the image capture to the person detecting unit 5. The captured image to be outputted by the second image capturing unit 4 to the person detecting unit 5 is a second image. The second space 10*b* is an entrance of a building where the first space 10*a* exists, an entrance connecting to the first space 10*a*, an elevator hall on the floor on which the first space 10*a* exists, or the like. The second space 20*b* exists on a movement path of a person coming in and out of the first space 10*a*.

When receiving an input of the captured image from the second image capturing unit 4, the person detecting unit 5 analyzes the captured image and checks whether the person 11*b* appears in the captured image. When the person 11*b* appears in the captured image, the person detecting unit 5 extracts, from the captured image, an image of a certain range covering the person 11*b*, and outputs the extracted image to the apparatus control unit 6 as a second extracted image. When plural persons appear in the captured image received from the second image capturing unit 4, the person detecting unit 5 extracts an image of a determined range covering a person for each of the persons appearing in the captured image. That is, when plural persons appear in the captured image, the person detecting unit 5 outputs second extracted images to the apparatus control unit 6, where the number of the second extracted images is equal to the number of the persons appearing in the captured image.

When receiving an input of the second extracted image from the person detecting unit 5, the apparatus control unit 6 controls the facility apparatus 8 with use of the inputted second extracted image and the already-learned model that is a learned result obtained by the learning unit 3. Specifically, the apparatus control unit 6 checks whether or not a feature of a person included in the second extracted image matches a feature indicated by the already-learned model. When these features match each other, the apparatus control unit 6 executes predetermined control on the facility apparatus 8. At this time, the apparatus control unit 6 uses the already-learned model to identify a staying location occupied by the person 11b when the person 11b stays in the first space 10a, the person 11b being included in the second extracted image, and controls the facility apparatus 8 associated with the identified staying location. For example, in a case where the facility apparatus 8 is an air conditioner, the apparatus control unit 6 executes control to start running of an air conditioner installed near the identified staying location, or to change a temperature setting so that the temperature at the identified staying location becomes a predetermined temperature. For example, in a case where the facility apparatus 8 is a lighting equipment, the apparatus control unit 6 executes control to cause the lighting equipment to light up, the lighting equipment being installed near the identified staying location, or to change the amount of light emission from the lighting equipment installed near the identified staying location. For another example, in a case where the facility apparatus 8 is a personal computer, the apparatus control unit 6 executes control to start-up a personal computer installed for the identified staying location. The apparatus control unit 6 is assumed to hold therein information on the installation location of each facility apparatus 8.

The display unit 7 displays a confirmation screen for checking the operation of the learning unit 3 and the operation of the apparatus control unit 6. For example, on the basis of the already-learned model held in the learning unit 3, the display unit 7 displays a screen intended to cause a user to check the learned result obtained by the learning unit 3. For example, the display unit 7 displays a screen intended to cause a user to check the details on the control executed on the facility apparatus 8.

Figure 2:
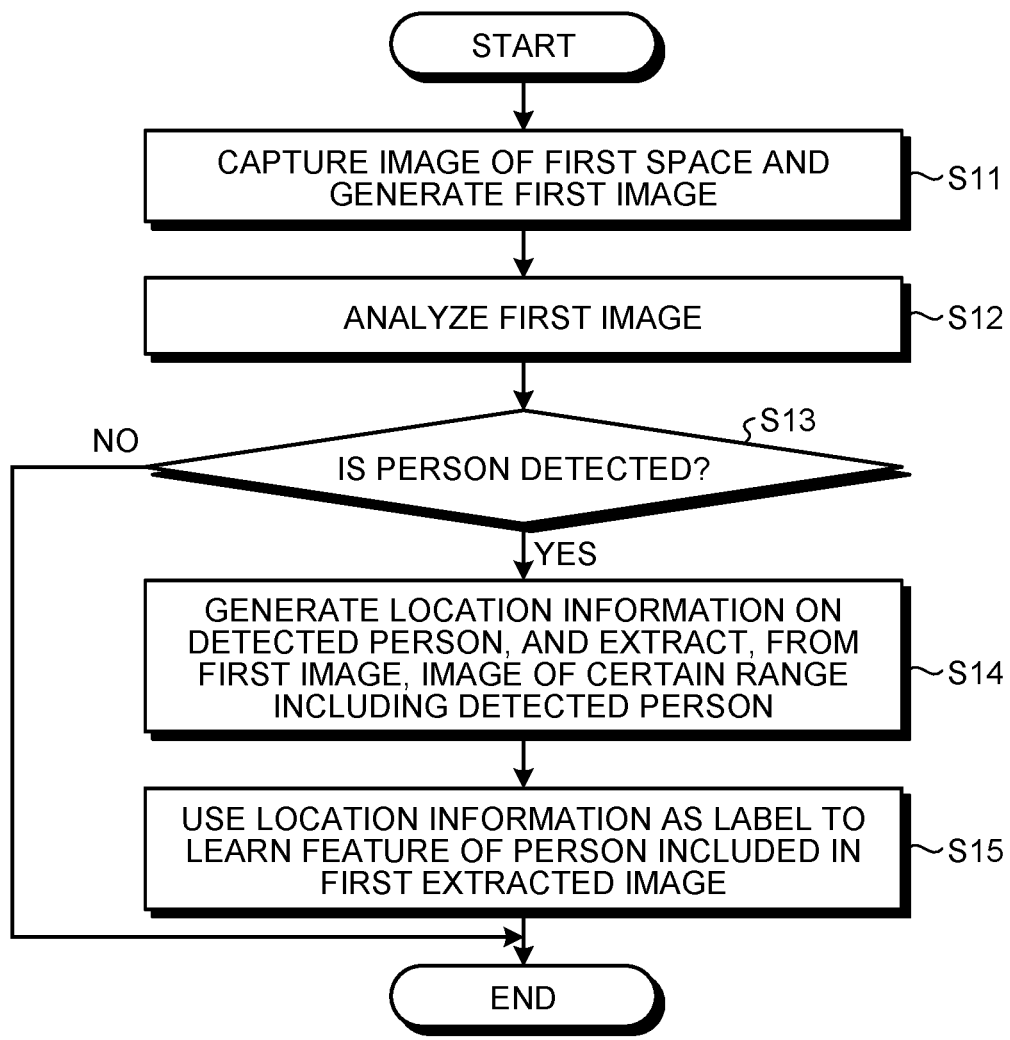
FIG. 2 is a flowchart illustrating an example of a learning operation of the facility apparatus control device according to the first embodiment.

Next, descriptions are made on the operation of the facility apparatus control device 100 learning a feature of the person 11a staying in the first space 10a in association with the staying location occupied by the person 11a. FIG. 2 is a flowchart illustrating an example of the learning operation of the facility apparatus control device 100 according to the first embodiment. The facility apparatus control device 100 periodically performs the operation according to a flowchart illustrated in FIG. 2 to thereby learn a feature of the person 11a staying in the first space 10a in association with the staying location occupied by the person 11a.

In the operation of the facility apparatus control device 100 learning a feature of a person, the first image capturing unit 1 initially captures an image of the first space 10a, and generates the captured image that is a first image (Step S11). Next, the data-for-learning generating unit 2 analyzes the first image outputted from the first image capturing unit 1 (Step S12), and checks whether or not some person is detected in the first space 10a, that is, whether or not the person 11a appears in the first image (Step S13).

When the data-for-learning generating unit 2 does not detect the person 11a in the first space 10a (NO at Step S13), the operation ends.

When detecting the person 11a in the first space 10a (YES at Step S13), the data-for-learning generating unit 2 generates location information on the person 11a detected, and further extracts, from the first image, an image of a determined range covering the person 11a detected (Step S14). In the following descriptions, an image extracted from the first image by the data-for-learning generating unit 2 at Step S14 is referred to as "first extracted image". At Step S14, for example, the data-for-learning generating unit 2 extracts, from the first image, an image of a predetermined size using the location of the head of the person 11a detected as a reference, and generates the extracted image as a first extracted image. The data-for-learning generating unit 2 outputs the location information and the first extracted image to the learning unit 3 as data for learning.

Next, the learning unit 3 receives the location information and the first extracted image outputted from the data-for-learning generating unit 2, and uses the location information as a label to learn a feature of a person included in the first extracted image (Step S15). At Step S15, the learning unit 3 learns a feature of a person occupying the location indicated by the location information.

By repeatedly performing the processes of Steps S11 to S15, the facility apparatus control device 100 learns a feature of the person 11a staying in the first space 10a for each staying location occupied by the person 11a. That is, the facility apparatus control device 100 learns where a person stays in the first space 10a and what features the person has.

Figure 3:
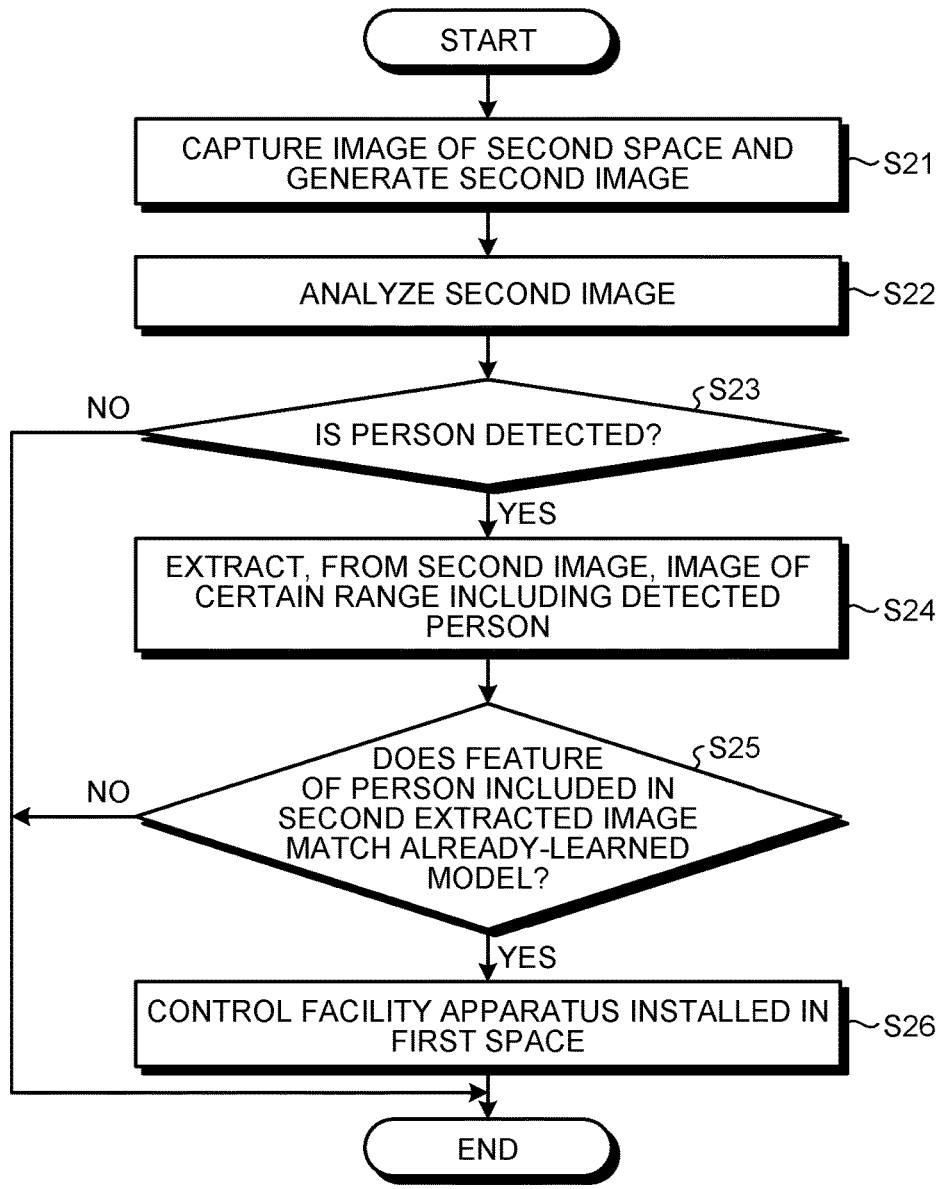
FIG. 3 is a flowchart illustrating an example of an operation for the facility apparatus control device according to the first embodiment to control a facility apparatus.

Subsequently, descriptions are made on the operation of the facility apparatus control device 100 controlling the facility apparatus 8, that is, the operation of the facility apparatus control device 100 detecting and identifying a person present in the second space 10b and accordingly controlling the facility apparatus 8. FIG. 3 is a flowchart illustrating an example of the operation of the facility apparatus control device 100 according to the first embodiment controlling the facility apparatus 8.

The facility apparatus control device 100 controls the facility apparatus 8 by periodically performing the operation according to the flowchart illustrated in FIG. 2.

In the operation of the facility apparatus control device 100 controlling the facility apparatus 8, the second image capturing unit 4 initially captures an image of the second space 10b, and generates the captured image that is a second image (Step S21). Next, the person detecting unit 5 analyzes the second image outputted from the second image capturing unit 4 (Step S22), and checks whether or not the person 11b is detected in the second space 10b, that is, whether or not the person 11b appears in the second image (Step S23).

When the person detecting unit 5 does not detect the person 11b in the second space 10b (NO at Step S23), the operation ends.

When detecting the person 11b in the second space 10b (YES at Step S23), the person detecting unit 5 extracts, from the second image, an image of a determined range covering the person 11b detected (Step S24). The process of Step S24, that is, the process of extracting an image of a determined range from the second image, which is performed by the person detecting unit 5 is equivalent to the process in which the data-for-learning generating unit 2 extracts an image of a determined range from the first image and generates the first extracted image at Step S14 described above. In the following descriptions, an image extracted from the second image by the person detecting unit 5 at Step S24 is referred to as "second extracted image". The person detecting unit 5 outputs the second extracted image to the apparatus control unit 6.

Next, the apparatus control unit 6 checks whether or not a feature of the person 11b included in the second extracted image matches the already-learned model, that is, whether or not the person 11b detected in the second space 10b corresponds to the already-learned person (Step S25). At Step S25, the apparatus control unit 6 generates a feature vector by analyzing the second extracted image, and compares the generated feature vector with a feature vector included in the already-learned model that is a learned result obtained by the learning unit 3, to thereby determine whether the person 11b detected in the second space 10b corresponds to the already-learned person. At least one person 11a stays in the first space 10a. Accordingly, the already-learned model includes one or more feature vectors, each of which represents a feature of a person staying in the first space 10a, in a state in which the feature vector is associated with the location information thereon. In a case where the already-learned model includes a plurality of feature vectors, the apparatus control unit 6 compares the feature vector obtained from the second extracted image with each of the feature vectors included in the already-learned model, and checks whether the matched pair of feature vectors is present. The said matched or match does not mean perfectly matched or match. Even when there is some extent of error between two feature vectors compared with each other, the apparatus control unit 6 determines that the feature vectors match each other. An allowable value for the error, which shows to what extent of the error the feature vectors are determined to be matched, is predetermined. Two or more allowable values for the error may be set in order for a user to be able to select which of the allowable values is to be used.

When a feature of the person 11b included in the second extracted image matches the already-learned model (YES at Step S25), the apparatus control unit 6 controls the facility apparatus 8 installed in the first space 10a (Step S26). At Step S26, the apparatus control unit 6 controls the facility apparatus 8 with use of the already-learned model and a feature vector generated by analyzing the second extracted image. Specifically, the apparatus control unit 6 controls the operation of the facility apparatus 8 present at a learned location as a target, or the facility apparatus 8 present in the vicinity of the learned location as a target, the learned location corresponding to a location indicated by location information associated with a feature vector that is determined to match the feature vector generated by analyzing the second extracted image upon the check of the already-learned model of the apparatus control unit 6. In a case where the apparatus control unit 6 controls the facility apparatus 8 present in the vicinity of the learned location, it is allowable that the apparatus control unit 6 sets the facility apparatus 8 closest to the learned location as a target to be controlled or sets N (N is an integer equal to or larger than 2) units of facility apparatus 8 in order from one closest to the learned location as targets to be controlled, or controls one or more units of facility apparatus 8, a distance of each of which from the learned location is equal to or shorter than a predetermined threshold.

When the feature of the person 11b included in the second extracted image does not match the already-learned model (NO at Step S25), the apparatus control unit 6 ends the operation without controlling the facility apparatus 8.

After having performed the learning operation illustrated in FIG. 2 first to learn the feature of the person 11a and the staying location thereof, the facility apparatus control device 100 starts the operation to control the facility apparatus 8 illustrated in FIG. 3, but the device 100 may continue the learning operation even after having started the operation to control the facility apparatus 8.

The facility apparatus control device 100 determines that the feature of the person 11b detected in the second space 10b matches the feature of the already-learned person 11a and then executes control to start the operation of the facility apparatus 8, whereafter, when a determined time has elapsed without detecting, in the first space 10a, a person corresponding to the person 11b detected in the second space 10b, the facility apparatus control device 100 may cancel the control on the corresponding facility apparatus 8. That is, when the facility apparatus control device 100 detects a state where the person 11b having been detected in the second space 10b is not staying in the first space 10a for the reason that the person 11b has moved to a different place instead of moving to the first space 10a or for some other reasons, the facility apparatus control device 100 may execute control to bring the facility apparatus 8 back into a state before the detection of the person 11b in the second space 10b. In the case of the operation as described above, for example, the data-for-learning generating unit 2 outputs the first extracted image to the learning unit 3 and the apparatus control unit 6, and then the apparatus control unit 6 analyzes the first extracted image to thereby determine whether or not the person 11b detected in the second space 10b has moved to the first space 10a.

In a case where there are a plurality of second spaces 10b, a plurality of second image capturing units 4 (the number of which is equal to the number of the second spaces 10b) are also provided. Each of the second image capturing units 4 captures an image of the second space 10b corresponding to the installation location, and outputs the second image to the person detecting unit 5. At this time, each of the second image capturing units 4 outputs the second image provided with information indicating the second space 10b that is a target of the image capture. Similarly, when the person detecting unit 5 outputs the second extracted image to the apparatus control unit 6, the person detecting unit 5 outputs the second extracted image provided with information indicating the second space 10b, that is, information indicating from which of the second images of the second spaces 10b this second extracted image is extracted. In this case, it is allowable that the apparatus control unit 6 controls the facility apparatus 8 when it is detected that the feature of the person 11b included in the second extracted image matches the already-learned model and the person 11b is moving toward the first space 10a. It is also allowable that the apparatus control unit 6 executes control to stop the operation of the facility apparatus 8 or some other appropriate control when it is detected that the feature of the person 11b included in the second extracted image matches the already-learned model and the person 11b is moving in a direction opposite to a direction toward the first space 10a.

As described above, the facility apparatus control device 100 according to the present embodiment cyclically captures an image of the first space 10a where the staying location when the person 11a is present in the first space 10a is fixed, and learns a feature of the person 11a and the staying location by analyzing the first image obtained. The facility apparatus control device apparatus 100 determines whether or not the person 11b included in the second image obtained by capturing an image of the second space 10b matches the person 11a staying in the first space 10a with use of the already-learned model that is a learned result. Then, when determining that the person 11b included in the second image matches the person 11a, the facility apparatus control device 100 controls the operation of the facility apparatus 8 associated with the staying location occupied by the person 11b in the first space 10a. Due to this control, even when there are two or more persons who are likely to stay in the first space 10a, it is still possible to perform control on the facility apparatus 8 in a manner suitable for the person staying in the first space 10a. As a result of this, the comfort of the person staying in the first space 10a is improved.

Figure 4:
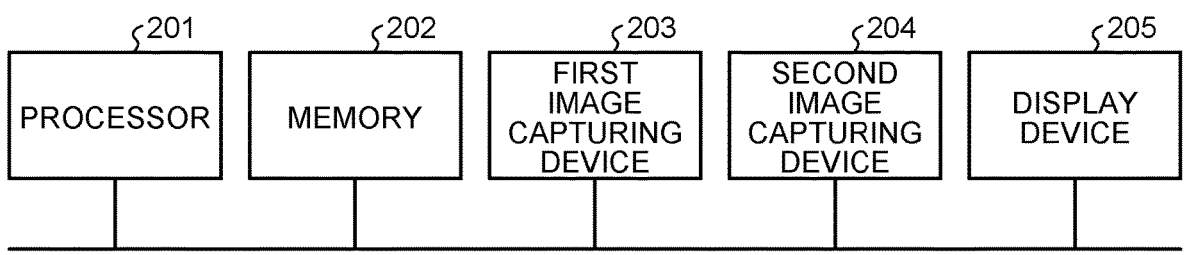
FIG. 4 is a diagram illustrating an example of hardware by which the facility apparatus control device according to the first embodiment is implemented.

Next, a hardware configuration of the facility apparatus control device 100 is described. FIG. 4 is a diagram illustrating an example of hardware by which the facility apparatus control device 100 according to the first embodiment is implemented. The facility apparatus control device 100 is implemented by, for example, a processor 201, a memory 202, a first image capturing device 203, a second image capturing device 204, and a display device 205, which are illustrated in FIG. 4.

The processor 201 is a device such as a CPU (Central Processing Unit; also referred to as a central processing device, a processing device, an arithmetic device, a microprocessor, a microcomputer, a processor, or a DSP (Digital Signal Processor)) or a system LSI (Large Scale Integration). The memory 202 is based on a non-volatile or volatile semiconductor memory such as a RAM (Random Access Memory), a ROM (Read Only Memory), a flash memory, an EPROM (Erasable Programmable Read Only Memory), or an EEPROM (registered trademark) (Electrically Erasable Programmable Read-Only Memory). The first image capturing device 203 and the second image capturing device 204 each correspond to a visible-light camera, an infrared camera, or the like. The display device 205 is based on a liquid crystal monitor, a display unit, or the like.

The data-for-learning generating unit 2, the learning unit 3, the person detecting unit 5, and the apparatus control unit 6 in the facility apparatus control device 100 are implemented by the processor 201 and the memory 202. Specifically, a program or programs configured to operate as the data-for-learning generating unit 2, the learning unit 3, the person detecting unit 5, and the apparatus control unit 6 are stored in the memory 202, and in this situation, the processor 201 reads and executes the programs stored in the memory 202, thereby implementing each of the units described above.

The first image capturing unit 1 and the second image capturing unit 4 in the facility apparatus control device 100 are implemented by the first image capturing device 203 and the second image capturing device 204, respectively. The display unit 7 in the facility apparatus control device 100 is implemented by the display device 205.

Second Embodiment

Figure 5:
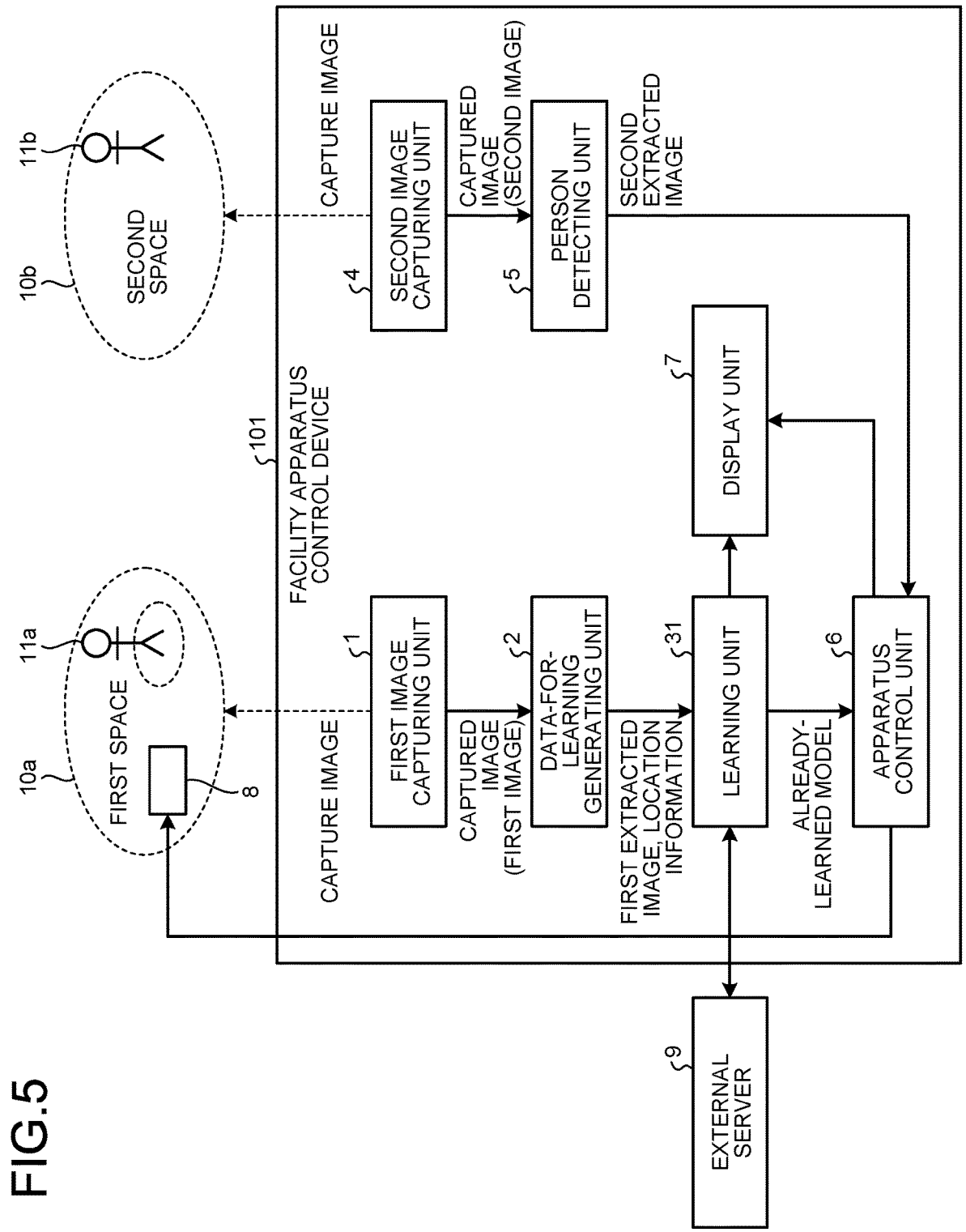
FIG. 5 is a diagram illustrating a configuration example of a facility apparatus control device according to a second embodiment.

FIG. 5 is a diagram illustrating a configuration example of a facility apparatus control device according to a second embodiment of the present invention. A facility apparatus control device 101 according to the second embodiment includes the first image capturing unit 1, the data-for-learning generating unit 2, a learning unit 31, the second image capturing unit 4, the person detecting unit 5, the apparatus control unit 6, and the display unit 7. In FIG. 5, like constituent elements as those of the facility apparatus control device 100 according to the first embodiment are denoted by like reference signs. That is, the facility apparatus control device 101 replaces the learning unit 3 in the facility apparatus control device 100 according to the first embodiment, with the learning unit 31. The constituent elements of the facility apparatus control device 101 other than the learning unit 31 are identical to those of the facility apparatus control device 100, and so descriptions of the constituent elements other than the learning unit 31 are omitted.

The learning unit 31 has a function of communicating with an external server 9 that is an external computer system. Upon reception of a first extracted image and location information from the data-for-learning generating unit 2, the learning unit 31 transmits the first extracted image and the location information to the external server 9, and requests the external server 9 to learn a feature of a person included in the first extracted image and a staying place occupied by the person in the first space 10a. The learning unit 31 then receives a learned result obtained by the external server 9 from the external server 9. The learning operation performed by the external server 9 is the same as the learning operation performed by the learning unit 3 of the facility apparatus control device 100 according to the first embodiment.

The facility apparatus control device 101 is implemented by a communication circuit used for communication with the external server 9, in addition to the processor 201, the memory 202, the first image capturing device 203, the second image capturing device 204, and the display device 205 illustrated in FIG. 4.

As described above, the facility apparatus control device 101 according to the present embodiment is configured such that the learning operation is performed by the external server 9, instead of being performed by the learning unit 3 of the facility apparatus control device 100 according to the first embodiment, or specifically, an operation to learn a feature of the person 11a staying in the first space 10a and the staying location occupied by the person 11a is performed by the external server 9. The facility apparatus control device 101 is configured to perform the learning operation whose processing load is higher in the external server 9, so that the facility apparatus control device 101 can be implemented by a low-performance and inexpensive processor.

In the first and second embodiments, when a person detected in the second space 10b is a person already learned, the facility apparatus control devices 100 and 101 execute control to start running of the facility apparatus 8. However, it is allowable that when a person detected in the second space 10b is the already-learned person, the facility apparatus control device executes control to stop running of the facility apparatus or some other control appropriate. That is, when detecting, in the second space 10b, the already-learned person, the facility apparatus control devices 100 and 101 may determine that the detected person is not staying in the first space 10a, and accordingly stop the operation of the facility apparatus 8. In the case of this control, the facility apparatus control devices 100 and 101 cyclically performs the operation to check a person staying in the first space 10a by analyzing the first image captured by the first image capturing unit 1. Then, when the person having stayed in the first space 10a is not present in the first space 10a, and thereafter when this person is detected in the second space 10b, then the facility apparatus control devices 100 and 101 execute control to stop the operation of the facility apparatus 8.

The configurations described in the above embodiments are only examples of the content of the present invention, and can each be combined with other publicly known techniques and partially omitted and/or modified without departing from the scope of the present invention.

The invention claimed is:

1. A facility apparatus control device comprising:
a first image capturing device that captures an image of a first space;
a second image capturing device that captures an image of a second space that does not entirely encompass and is not entirely encompassed by the first space;
a data-for-learning generating circuit that
generates location information on a person present in the first space by analyzing a first image and
extracts, from the first image, an image of a determined range covering the person present in the first space, the first image being an image captured by the first image capturing device;
a learning circuit that learns, using the location information generated by the data-for-learning generating circuit and a first extracted image,
a feature of the person present in the first space and
a staying location occupied by the person present in the first space, the first extracted image being an image extracted by the data-for-learning generating circuit;
a person detecting circuit that
detects a person present in the second space by analyzing a second image and
extracts, from the second image, an image of a determined range covering the detected person, the second image being an image captured by the second image capturing device; and
an apparatus control circuit that controls a facility apparatus installed in the first space with use of the second extracted image and a learned result obtained by the learning circuit, the second extracted image being an image extracted by the person detecting circuit, wherein
the learned result obtained by the learning circuit and used by the apparatus control circuit includes the feature of the person present in the first space and the staying location occupied by the person present in the first space.

2. The facility apparatus control device according to claim 1, wherein
the apparatus control circuit determines whether or not a feature of the person present in the second space matches a feature of a person already learned by the learning circuit with use of the second extracted image and the learned result, and
when the features match each other, the apparatus control circuit controls the facility apparatus installed in the first space.

3. The facility apparatus control device according to claim 2, wherein
the apparatus control circuit controls, among two or more facility apparatuses installed in the first space, a facility apparatus associated with the staying location where the person present in the second space stays in the first space.

4. The facility apparatus control device according to claim 1, comprising
a display unit that displays the learned result.

5. The facility apparatus control device according to claim 1, wherein
the first image and the second image are thermal images.

6. The facility apparatus control device according to claim 1, wherein
the facility apparatus is an air-conditioning device.

7. The facility apparatus control device according to claim 1, wherein
the learning circuit utilizes an external computer system to learn a feature of the person
present in the first space and the staying location in the first space, occupied by the person present in the first space.

8. A facility apparatus control method comprising:
a first image capturing step of capturing an image of a first space by a facility apparatus control device;
a data-for-learning generating step of, by the facility apparatus control device,
generating location information on a person present in the first space by analyzing a first image and
extracting, from the first image, an image of a determined range covering the person present in the first space, the first image being an image captured at the first image capturing step;
a learning step of, by the facility apparatus control device, learning, with use of the location information generated at the data-for-learning generating step and a first extracted image,
a feature of the person present in the first space and
a staying location occupied by the person present in the first space, the first extracted image being an image extracted at the data-for-learning generating step;
a second image capturing step of capturing an image of a second space by the facility apparatus control device, the second space not entirely encompassing and not entirely being encompassed by the first space;
a person detecting step of, by the facility apparatus control device,
detecting a person present in the second space by analyzing a second image and
extracting, from the second image, an image of a determined range including the detected person, the second image being an image captured at the second image capturing step; and
an apparatus controlling step of, by the facility apparatus control device, controlling a facility apparatus installed in the first space with use of a second extracted image and a learned result obtained at the learning step, the second extracted image being an image extracted at the person detecting step, wherein
the learned result obtained in the learning step and used in the apparatus controlling step includes the feature of the person present in the first space and the staying location occupied by the person present in the first space.

* * * * *